J. WILKINSON.
APPARATUS FOR TESTING GEAR WHEELS.
APPLICATION FILED OCT. 16, 1919.

1,374,698.

Patented Apr. 12, 1921.

Inventor:
James Wilkinson,
by Albert G. Davis
His Attorney.

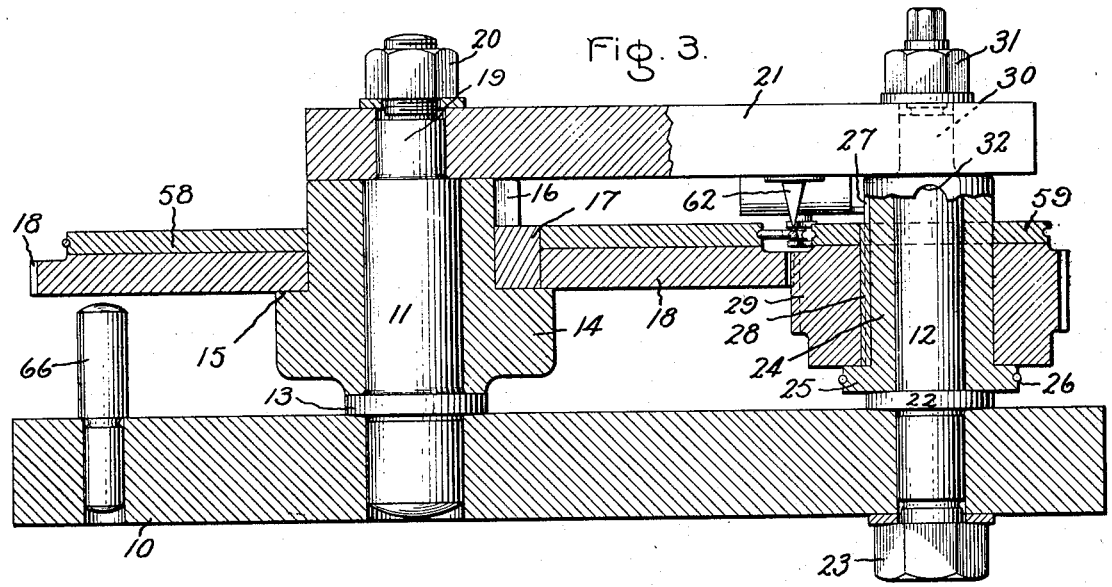
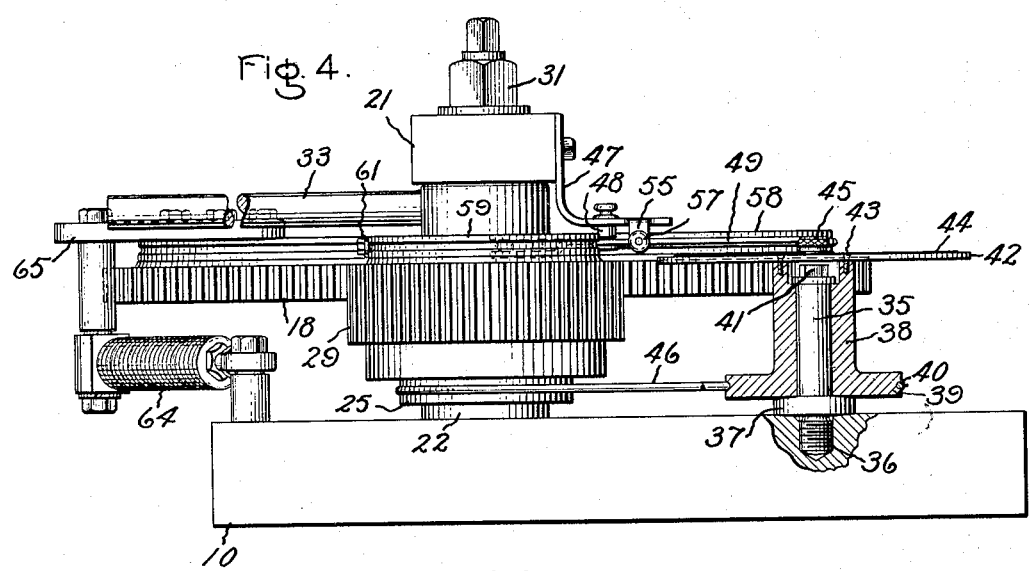
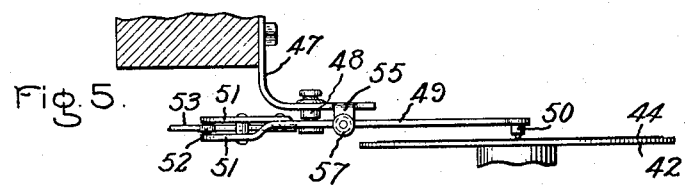

J. WILKINSON.
APPARATUS FOR TESTING GEAR WHEELS.
APPLICATION FILED OCT. 16, 1919.

1,374,698.

Patented Apr. 12, 1921.

3 SHEETS—SHEET 3.

Inventor:
James Wilkinson,
by *Albert G. Davis*
His Attorney.

UNITED STATES PATENT OFFICE.

JAMES WILKINSON, OF SCHENECTADY. NEW YORK, ASSIGNOR TO GENERAL ELECTRIC COMPANY, A CORPORATION OF NEW YORK.

APPARATUS FOR TESTING GEAR-WHEELS.

1,374,698.   Specification of Letters Patent.   Patented Apr. 12, 1921.

Application filed October 16, 1919. Serial No. 330,954.

*To all whom it may concern:*

Be it known that I, JAMES WILKINSON, a citizen of the United States, residing at Schenectady, in the county of Schenectady, State of New York, have invented certain new and useful Improvements in Apparatus for Testing Gear-Wheels, of which the following is a specification.

In connection with gear wheels, particularly high speed gear wheels transmitting large loads, it is very essential that the gear teeth be accurately formed and that they mesh correctly if quiet running and long life are to be obtained, and the object of the present invention is to provide an improved apparatus for testing the accuracy of the formation of the teeth of gear wheels and the accuracy with which they mesh, or in other words, an improved apparatus which enables me to obtain complete data as to the operative condition of a gear wheel or set of gear wheels.

For a consideration of what I believe to be novel and my invention, attention is directed to the accompanying description and the claims appended thereto.

Figure 1:
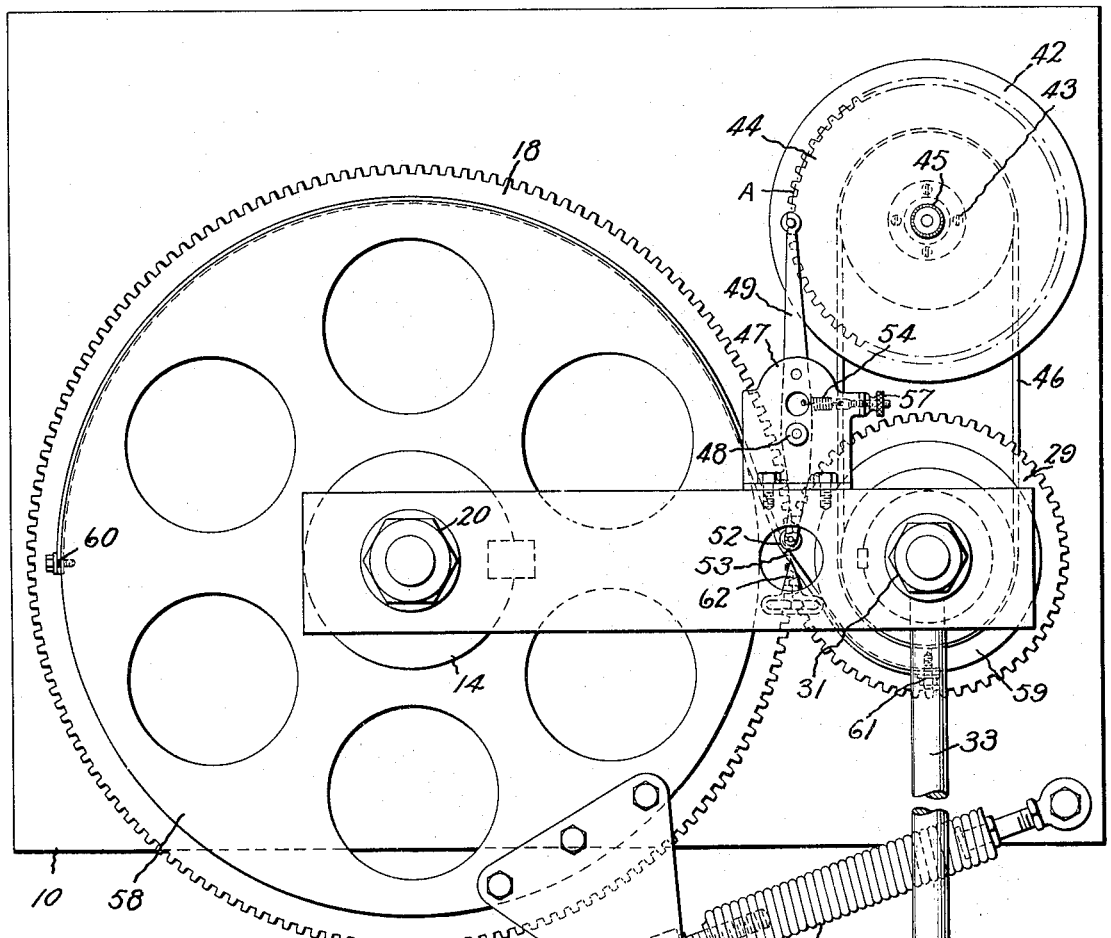
Figure 2:
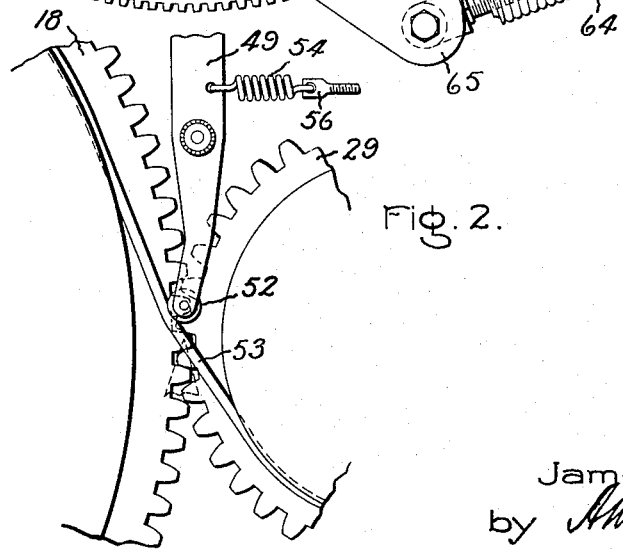
Figure 6:
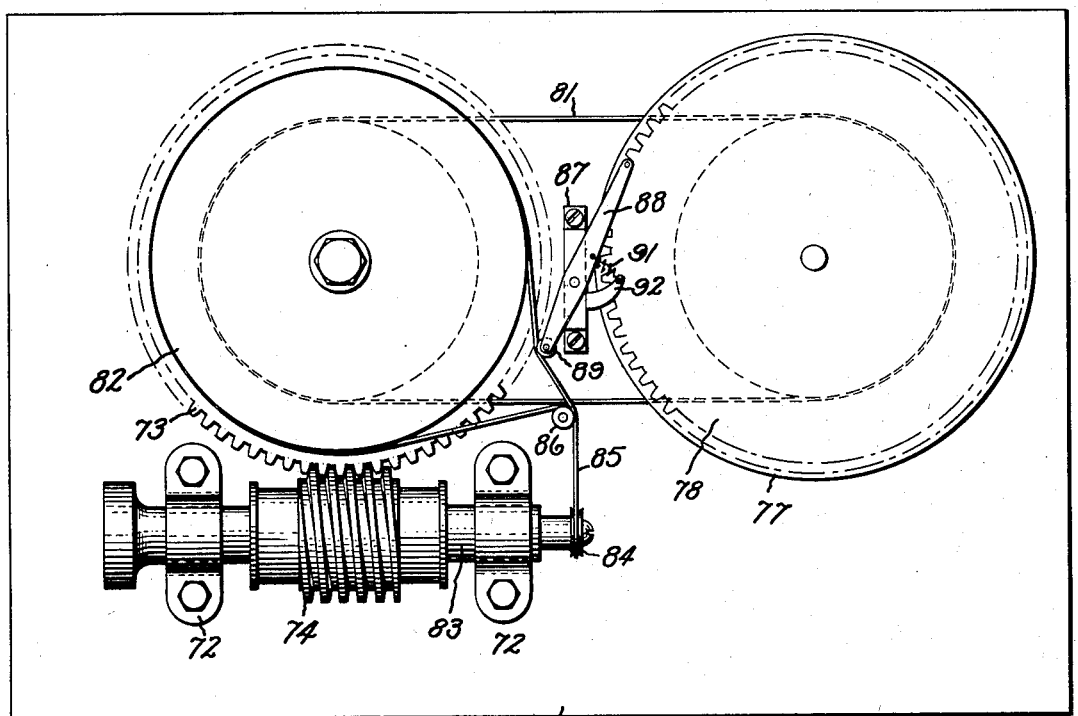
Figure 7:
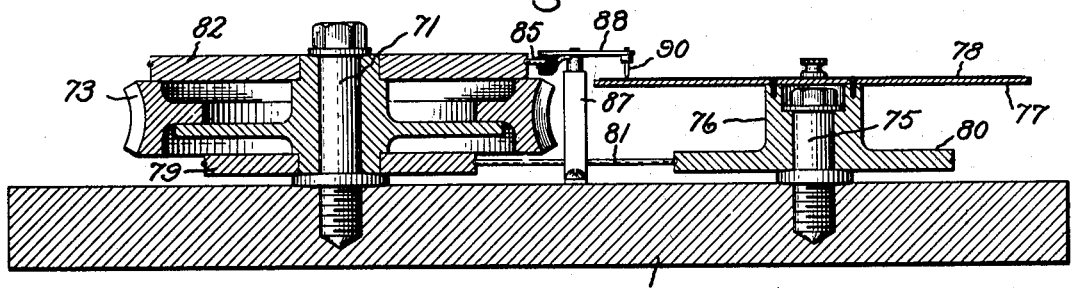
Figure 8:
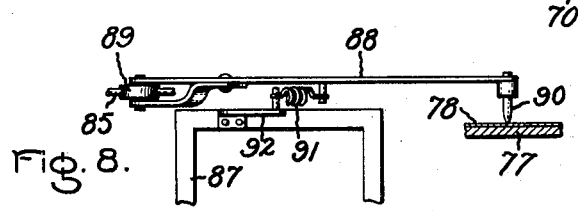

In the drawing, Figure 1 is a plan view of an apparatus embodying my invention with a gear wheel and pinion mounted thereon for testing; Fig. 2 is a plan view on a larger scale of the gear wheel and pinion at the point where they mesh; Fig. 3 is a longitudinal sectional view of the apparatus; Fig. 4 is an end view of Fig. 1 partly in section; Fig. 5 is a detail view of a part of the recording mechanism; and Figs. 6, 7 and 8 are views similar to Figs. 1, 3 and 5 of a modification.

Referring to Figs. 1 to 5 inclusive, 10 indicates a base upon which are mounted two stationary shafts 11 and 12, the shaft 11 being hereinafter termed the gear shaft and the shaft 12 the pinion shaft. Shaft 11 is provided with a collar 13 which engages base 10 and against which the lower end of a hub 14 rests, which hub turns on the shaft. Hub 14 is provided with a collar 15 and a keyway 16 adapted to receive a key 17 for fastening a gear wheel 18 on the hub against collar 15. On the outer end of shaft 11 is a stud 19 the end of which is threaded to receive a nut 20 for fastening in place one end of a tie bar 21.

Shaft 12 is provided with a flange 22 which rests against base 10 and the lower end of shaft 12 is threaded to receive a nut 23 for fastening the shaft to the base. Rotatably mounted on shaft 12 with its lower end resting against flange 22 is a hub 24 provided at its lower end with a collar 25 having a groove 26 in its edge whereby the collar may serve as a pulley. Hub 24 is provided with a keyway 27 to receive a key 28 for fastening a pinion 29 on the hub. On the upper end of shaft 12 is a stud 30 which passes through an opening in the other end of tie bar 21 and receives on its end a nut 31 to fasten the tie bar in place. In hub 24 is an opening 32 to receive one end of a handle 33 for turning hub 24.

Mounted on base 10 is a third fixed shaft 35 having a threaded portion 36 which screws into base 10 and a collar 37 which rests against base 10. Mounted on shaft 35 is a hub 38 provided with a flange 39 having a groove 40 on its edge whereby it forms a pulley. The outer end of hub 38 is countersunk to receive a nut 41 which threads onto the reduced end of shaft 35 to hold hub 38 in position. On the upper end of hub 38 is fastened a turntable 42 by means of screws 43, which turntable is adapted to carry a paper chart indicated at 44. Chart 4 is fastened to turntable 42 by a thumb nut 45 which screws onto a small stud projecting from the center of the turntable up through a hole in the center of chart 44. Movement is transmitted from hub 24 to turntable 42 by a belt 46 located in the grooves in collar 25 and flange 39.

Carried by tie bar 21 is a bracket 47 having a pivot stud 48 on which is pivoted an arm 49 for movement in a plane parallel to turntable 42. One end of arm 49 projects over the chart 44 on turntable 42 and is provided at its extremity with a marking means 50 which may be a suitable pencil or pen point. The other end of arm 49 is provided with furcations 51 between which is mounted a roller 52 which bears against a wire 53, such as a piano wire, and held there by a spring 54 which has one end connected to arm 49 and the other end connected to an ear 55 depending from bracket 47. The connection of spring 54 to ear 55 may be made conveniently by means of an eyebolt 56 fastened to ear 55 by a nut 57. By turning nut 57 the tension of spring 54 may be adjusted as is obvious. Carried by gear wheel 18 is a base circle plate 58 having a groove in its edge and carried by pinion 29 is a base circle plate 59 also having a groove in its edge. A wire 53 is arranged in such grooves and as best shown in Fig. 1 has one end connected to plate 58 at 60 from which point it passes over the top of plate 58 thence across the pitch circle at about the point where gear wheel 18 and pinion 29 mesh and around the lower side of plate 59 to which it is fastened at 61. The fastening at 60 is so arranged that it may be turned to wrap the wire around it so it may serve as a means for tightening the wire. Fastened to the under side of tie bar 21 is a pointer 62 which is used to indicate the setting of the gear teeth for zero or starting position.

Gear shaft 11 and pinion shaft 12 are arranged a distance apart so that when gear wheel 18 and pinion 29 are placed on such shafts, the gear wheel and pinion will mesh correctly. For different sizes of gear wheels and pinions, different bases 10 may be provided or the same base plate may be arranged with openings for various sizes of gears. In order to put a load on the gear wheels to take out the back lash and bring the teeth into firm engagement I provide a loading means which may take the form of a friction brake, a spring, or other suitable means. In the present instance I have illustrated a spring 64 one end of which is connected to base 10 and the other end to a projection 65 carried by base circle plate 58. I also show a post 66 which may be used to support a friction brake to be applied to hub 14.

In testing a gearing with the apparatus described, I take the gear wheel 18 and pinion 29 which are to be tested, key them to hubs 14 and 24 respectively and place the hubs on shafts 11 and 12 so that the gear wheel and pinion are in mesh. On gear wheel 18 and fixed to hub 14 is placed the circular plate 58, and on pinion 29 and fixed to hub 24 is placed the circular plate 59. Circular plates 58 and 59 have diameters equal to or bearing the same proportionate relation to the diameters of the base circles of gear wheel 18 and pinion 29 respectively. Or, in other words, they have diameters such that the ratio of their angular speeds to each other is the same as that of their shafts. Preferably they have diameters equal to the base circle diameters. Wire 53 is put into position as shown in Fig. 1 and a chart 44 is placed on turntable 42. Chart 44 has laid off thereon the outline of a gear wheel with the pitch circle drawn on it, as indicated at A. The driving connection between hub 24 and hub 38 is such that when pinion 29 is turned, chart 44 will have an angular speed exactly equal to that of the pinion and gear wheel. Roller 52 on the end of arm 49 rests against wire 53 putting a slight bow or bend in it, spring 54 being adjusted by means of nut 57 to give the desired pressure of the roller on the wire. Chart 44 is set so the teeth on it correspond exactly with the position of the teeth on pinion 29 and the tooth under pointer 62 and the tooth on chart 44 under the marking means 50 are suitably marked to indicate the starting point. The gearing is then turned by means of handle 33, against the action of spring 64 or a friction brake which serves to put a load on it.

It will be clear that if the gear teeth are correct the angular movement of the gear wheel and pinion will be exactly the same and wire 53 will be wound off of base circle plate 58 on to base circle plate 59 without either increase or decrease in tension. As a result point 49 stands still and marking means 50 traces an arc of a circle on chart 44. If, however, the teeth are not correct then there will be angular acceleration or deceleration of the gear wheel and pinion relatively to each other with the result that the tension on wire 53 will vary thus causing pointer 49 to move in a plane parallel to that of chart 44 and hence trace an irregular line on chart 44. By the location of the irregularities of the line traced, the inaccurate teeth can be determined. Also by applying sufficient known load to the gearing being tested I can determine the point of teeth flexure and also the breakdown load of the teeth.

Referring now to Figs. 6, 7 and 8, I have illustrated a modified form of my invention which is adapted for testing the accuracy of worm gearing. 70 indicates a base provided with a fixed stub shaft 71 and a pair of bearings 72 adapted to receive a worm wheel 73 and worm 74, as shown, and support them in correct position for meshing. On base 70 is a second fixed stub shaft 75 on which is rotatably mounted a hub 76 which carries a turntable 77 for supporting a paper chart 78. On the hub of worm wheel 73 is a pulley 79 which is connected to a pulley 80 on hub 75 by a suitable belt 81 so that as worm wheel 73 turns, turntable 77 will be turned at the same angular speed. Fastened to worm wheel 73 to turn therewith is a circular plate 82 and fastened on an end of shaft 83 of worm 74 is a pulley 84. Circular plate 82 and pulley 84 are of such relative diameters that their angular speeds bear the same relation to each other as to the angular speeds of their shafts. Connecting plate 82 to pulley 84 is a suitable wire 85 which forms an endless belt, the same passing over a guide pulley or idler 86 to take care of the turn in the wire.

Supported on base 70 is a rectangular frame 87 on which is pivoted an arm 88. One end of arm 88 is provided with a roller 89 which engages wire 85 and the other end is provided with a marking means 90 adapted to trace a line on chart 78. Roller 89 is held in engagement with wire 85 by a spring 91, one end of which is connected to lever 88 and the other end to an arm 92 projecting from frame 87. Spring 91 causes roll 89 to bear against wire 85 sufficiently hard to put it under a slight amount of tension and make a slight bow in it as indicated in Fig. 6.

The operation of the arrangement shown in Figs. 6, 7 and 8 is similar to that of the apparatus shown in Figs. 1 to 5 inclusive. The apparatus is arranged after the manner shown in Figs. 6 to 8, worm wheel 73 and worm 74 being the gears to be tested. Chart 78 has laid off thereon the outlines of a worm wheel corresponding to worm wheel 73. The tooth on chart 78 at which marking means 90 stands and the tooth of worm wheel 73 at the center of worm 74 are marked and a turning movement is then applied to worm 74 by suitable means, (not shown) a load preferably in the form of a friction brake, being also applied to the gearing to take out the back lash. If now the worm wheel and worm are accurately cut there will be neither acceleration or deceleration of the tooth action and the wire 85 will move without variation in its tension and hence without moving lever 88. As a result, marking means 90 will trace a perfect circle on chart 78. However, if there are any inaccuracies in tooth structures then accelerations or decelerations of the tooth action will occur with the result that the tension of wire 85 will be varied thus varying the bow in it and causing lever 88 to turn on its pivot point and make an irregular line on the chart. From the location of such irregularities the tooth or teeth which are inaccurate can be located and any inaccuracy of the worm can be detected. Also by applying sufficient load to the gearing the point of flexure and of breakdown of the teeth can be determined.

While in the drawings I have particularly illustrated and described embodiments of my gearing indicator adapted for testing spur gearing and worm gearing, it will of course be understood that such gearing indicator may be used in connection with helical or other types of gearing. It will also be clear that by testing gears under varying conditions or at various times data as to their operating conditions under such conditions and at such times may be obtained.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a gearing indicator, means for supporting the gears to be tested in mesh, a wire, means comprising pulleys over which the wire runs, said pulleys being arranged to turn with the gears, and means controlled by the wire for indicating variations in the tension of said wire.

2. In a gearing indicator, means for supporting the gears to be tested in mesh, a circular member attached to each gear to turn therewith, a wire which extends from one of said circular members to the other, said circular members having such diameter that the relation of their angular speeds is equal to that of the gears, and means controlled by the wire for indicating variations in the tension of said wire.

3. In a gearing indicator, means for supporting the gears to be tested in mesh, a circular member attached to each gear to turn therewith, a wire which extends from one of said circular members to the other, and means for indicating variations in the tension of said wire, said means comprising a lever one end of which engages said wire and maintains a slight bend therein.

4. In a gearing indicator, means for supporting the gears to be tested in mesh, a circular member attached to each gear to turn therewith, a wire which extends from one of said circular members to the other, a pivoted lever one end of which engages said wire and maintains a slight bend therein, an indicating means actuated by the other end of said lever, and a chart for said indicating means.

5. In a gearing indicator, means for supporting the gears to be tested in mesh, a circular member attached to each gear to turn therewith, a wire which extends from one of said circular members to the other, a pivoted lever one end of which engages said wire and maintains a slight bend therein, an indicating means actuated by the other end of said lever, a chart, and means for driving the chart in synchronism with the gearing.

6. In a gearing indicator, means for supporting the gears to be tested in mesh, a circular member attached to each gear to turn therewith, the diameters of said circular members bearing the same ratio to the diameters of the base circles of said gears, a wire which extends from one circular member to the other and is wound on them, yielding means which engages the wire and maintains a bend therein, and means for indicating movements of said yielding means.

7. In a gearing indicator, means for supporting the gears to be tested in mesh, a circular member attached to each gear to turn therewith, the diameters of said circular members bearing the same ratio to the diameters of the base circles of said gears, a wire which extends from one circular member to the other and is wound on them, yielding means which engages the wire and maintains a bend therein, a chart, means for driving the chart in synchronism with the gears, and means for recording movements of said yielding means on said chart.

In witness whereof, I have hereunto set my hand this 15th day of October, 1919.

JAMES WILKINSON.